United States Patent
Andersen

(10) Patent No.: US 8,570,607 B2
(45) Date of Patent: Oct. 29, 2013

(54) SCANNER WITH A MULTIPLE LEAD WORM GEAR

(75) Inventor: Eric L Andersen, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

(21) Appl. No.: 13/205,709

(22) Filed: Aug. 9, 2011

(65) Prior Publication Data

US 2013/0038909 A1 Feb. 14, 2013

(51) Int. Cl.
*H04N 1/21* (2006.01)
*F16H 13/02* (2006.01)
*F16H 13/10* (2006.01)
*B62M 7/10* (2006.01)
*A47F 5/025* (2006.01)

(52) U.S. Cl.
USPC ............... 358/296; 476/27; 476/28; 476/34; 476/35

(58) Field of Classification Search
None
See application file for complete search history.

(56) References Cited

U.S. PATENT DOCUMENTS

| | | | |
|---|---|---|---|
| 2,959,977 A * | 11/1960 | Franke | 74/458 |
| 5,669,033 A | 9/1997 | Takata et al. | |
| 6,118,553 A | 9/2000 | Berg | |
| 6,631,014 B1 * | 10/2003 | Aoshima et al. | 358/497 |
| 7,253,930 B2 | 8/2007 | Hendrix et al. | |
| 7,944,591 B2 | 5/2011 | Bokelman et al. | |
| RE42,823 E * | 10/2011 | Tsai et al. | 358/487 |
| 2009/0109499 A1 | 4/2009 | Smith et al. | |

OTHER PUBLICATIONS

Suvo, What is a Self Locking Worm Gear? How does it Work?, Mar. 4, 2010, Bright Hub Engineering.*

* cited by examiner

*Primary Examiner* — Barbara Reinier
(74) *Attorney, Agent, or Firm* — Steven L. Webb

(57) ABSTRACT

A scanner drive system is disclosed. The scanner drive system has a drive motor. The drive motor has a worm gear attached to the motor spindle. The worm gear has multiple leads. The worm gear is meshed with a helical gear. The helical gear is coupled to a drive train that moves a scanning module.

12 Claims, 2 Drawing Sheets

SCANNER WITH A MULTIPLE LEAD WORM GEAR

BACKGROUND

Many scanners use stepper motors in their drive trains. Stepper motors have high torque at low RPM's but have limited speed ranges. The torque of a stepper motor decreases as the speed of the stepper motor increases. DC motors have wide speed ranges but don't have high torque at low RPM's. The torque of a DC motor increases as the speed of the motor increases. DC motors are typically cheaper than stepper motors.

DETAILED DESCRIPTION

Figure 1:
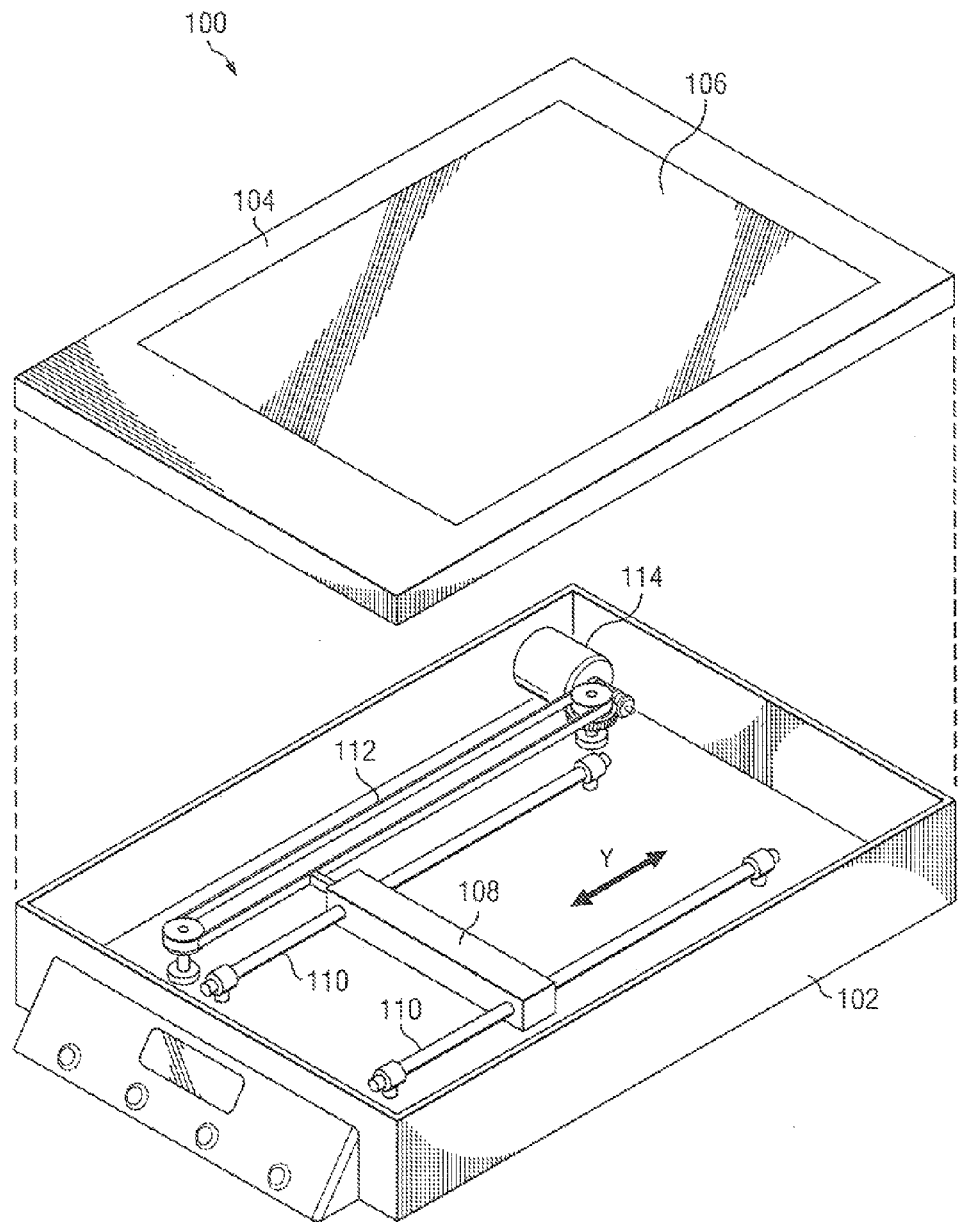
FIG. 1 is an isometric top view of a scanner 100 in an example embodiment of the invention.
Figure 2:
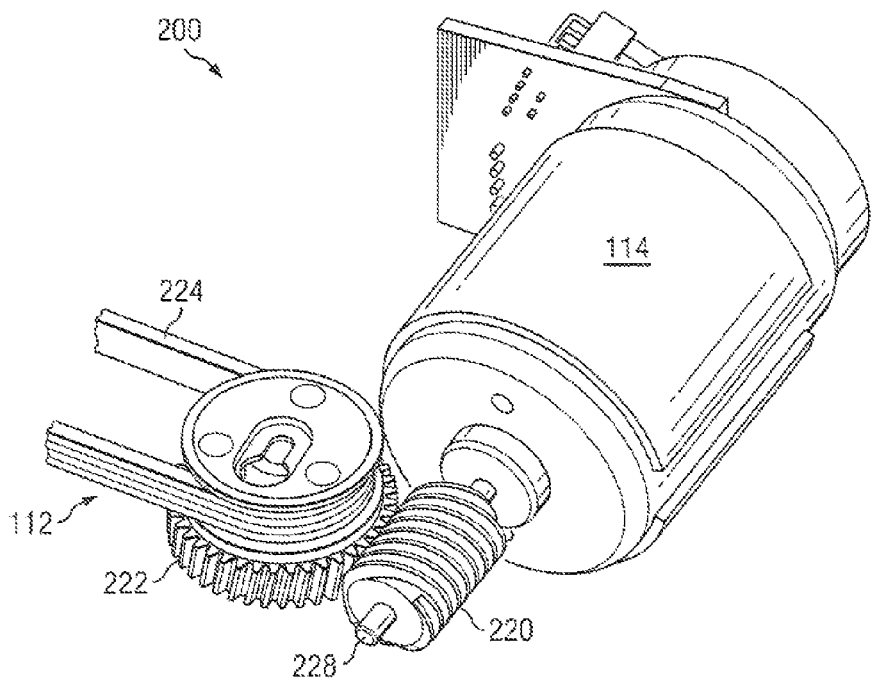
FIG. 2 is an isometric partial top view of a scanner drive system 200 in an example embodiment of the invention.
Figure 3:
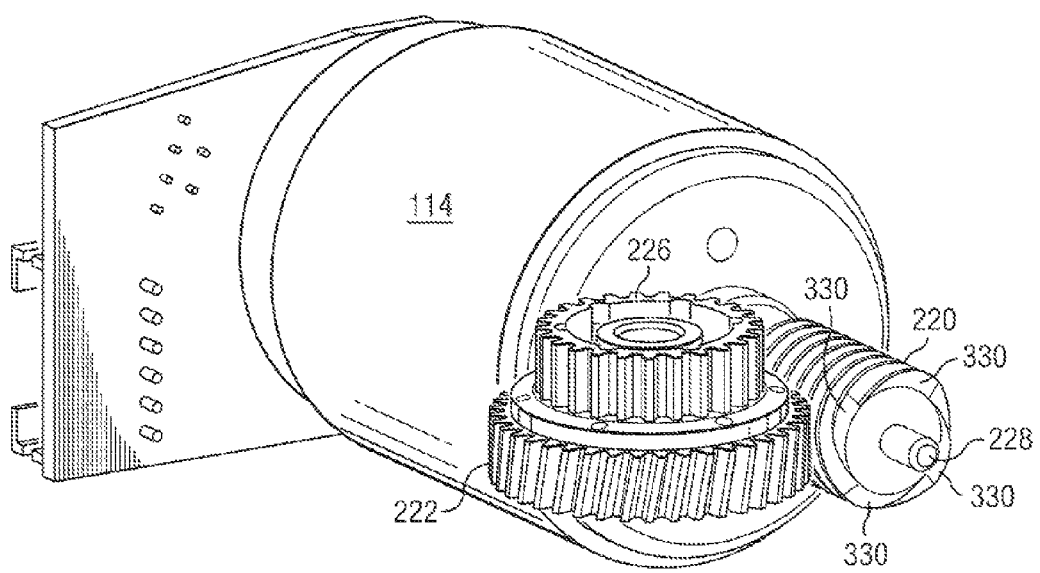
FIG. 3 is an isometric front view of a drive motor in an example embodiment of the invention.

FIGS. 1-3, and the following description depict specific examples of the invention. For the purpose of teaching inventive principles, some conventional aspects have been simplified or omitted. Those skilled in the art will appreciate variations from these examples that fall within the scope of the invention. The features described below can be combined in various ways to form multiple variations of the invention. As a result, the invention is not limited to the specific examples described below, but only by the claims and their equivalents.

FIG. 1 is an isometric top view of a scanner 100 in an example embodiment of the invention. Scanner 100 comprises a scanner base 102 and a top cover 104. The top cover has a flatbed glass 106 mounted on the top side of the top cover 104. The top cover 104 mounts to the scanner base 102. A cavity is formed inside the scanner base 102. Mounted within the cavity in the scanner base is a scanning module 108. In one example embodiment of the invention, the scanning module 108 may be mounted on a pair of rails 110 that allow the scanning module 108 to move along a scanning direction (axis Y). In other examples, the scanning module 108 may have wheels (not shown) that ride along the underside of flatbed glass 106. Scanner 100 can be any size, for example A3, A4 or the like.

Scanning module 108 is attached to drive train 112. Drive train 112 is coupled to a drive motor 114. Drive train 112 and drive motor 114 are mounted in scanner base 102. Drive motor 114 is used to move drive train 112, thereby moving scanner module 108 along the scanning direction (axis Y). In this example embodiment of the invention, drive train 112 is a belt drive. In other examples, the drive train may be implemented using gears, for example a rack and pinion gear set.

FIG. 2 is an isometric partial top view of a scanner drive system 200 in an example embodiment of the invention. Scanner drive system 200 comprises a drive motor 114 and a drive train 112. Drive motor 114 has a worm gear 220 mounted to the motor spindle 228. Drive train 112 comprises helical gear 222, gear 226 and belt 224. Helical gear 222 is meshed with worm gear 220. Gear 226 is mounted to, or formed on, the top of helical gear 222 (see also FIG. 3). Helical gear 222 and gear 226 have a common axis of rotation. Belt 224 mounts on, and is turned by, gear 226. In one example embodiment of the invention, drive motor 114 is a DC motor. Worm gear 220 has more than one lead. In one example, worm gear has four different leads (see also FIG. 3).

FIG. 3 is an isometric front view of a drive motor 114 in an example embodiment of the invention. Drive motor has a worm gear 220 mounted to its spindle 228. Worm gear 220 is meshed with helical gear 222. Gear 226 is mounted to the top of helical gear 222. Worm gear 220 has more than one lead. Worm gear can have any number of multiple leads, for example two leads, three leads, four leads, six leads, or the like. Because worm gear 220 has more than one lead, helical gear 222 is rotated at a lower rate for a given motor spindle rotational speed compared to a worm gear with only one lead. When worm gear 220 has four leads 330 (as shown) there is a 4 to 1 reduction in rotational speed for helical gear 222 compared to a worm gear with only one lead. Because of the extra reduction in rotational speed of the helical gear due to the multiple lead worm gear, the torque range of a DC motor can be reached using fewer gears in the drive train. This may also allows drive train 112 to be driven at a slower speed for a given rotational speed of drive motor 114. In addition, by adjusting the gear tooth lead and pressure angle of the worm and helical gears, the carriage lock can be eliminated, since the gear train will self-lock automatically (i.e. the helical gear can't back drive the worm gear).

What is claimed is:

1. A scanner, comprising:
   a scanner base and a top cover, the top cover having a flatbed glass attached thereto, the top cover mounted to the scanner base, the scanner base forming a cavity;
   a drive motor attached to the scanner base inside the cavity, the drive motor having a spindle;
   a worm gear attached to the spindle, the worm gear having at least four leads;
   a helical gear meshed with the worm gear and coupled to a drive train;
   a scanning module located inside the cavity and coupled to the drive train, the scanner module movable along a scanning direction by the drive train.

2. The scanner of claim 1, wherein the scanner size is a size selected from the group of sizes comprising: an A3 size and an A4 size.

3. The scanner of claim 1, wherein the drive motor is a DC motor.

4. The scanner of claim 1, further comprising:
   a gear coupled to the helical gear and having a common axis of rotation; and
   wherein the drive train comprises a belt drive and the belt is driven by the gear.

5. The scanner of claim 1, wherein the worm gear and the helical gear self-lock the drive train.

6. A scanner drive system, comprising:
   a drive motor, the drive motor having a spindle;
   a worm gear attached to the spindle, the worm gear having multiple leads;
   a helical gear meshed to the worm gear and coupled to a drive train;
   a scanning module coupled to the drive train, the scanner module movable along a scanning direction by the drive train; and
   wherein the worm gear has four leads.

7. The scanner drive system of claim 6, wherein the drive motor is a DC motor.

8. The scanner drive system of claim 6, wherein the drive train comprises a belt drive.

9. The scanner drive system of claim 6, wherein the worm gear and the helical gear self-lock the drive train.

10. The scanner drive system of claim 6, further comprises:

a scanner base, the drive motor attached to the scanner base.

11. A method of driving a scanning module, comprising:

rotating a worm gear attached to a motor spindle at a first rotational speed;

reducing the first rotational speed to a second rotational speed using a helical gear meshed with the worm gear, wherein the worm gear has it least four leads and wherein the helical gear turns at the second rotational speed;

moving a drive train with the helical gear;

moving the scanning module along a scanning direction with the drive train.

12. The method of driving a scanning, module of claim 11, wherein the chive train comprises a belt drive and the belt is driven by a gear and where the gear is coupled to the helical gear with a common axis of rotation.

* * * * *

UNITED STATES PATENT AND TRADEMARK OFFICE
CERTIFICATE OF CORRECTION

PATENT NO. : 8,570,607 B2  
APPLICATION NO. : 13/205709  
DATED : October 29, 2013  
INVENTOR(S) : Andersen It is certified that error appears in the above-identified patent and that said Letters Patent is hereby corrected as shown below:

In the Claims

Column 3, line 8, in Claim 11, delete "it" and insert -- at --, therefor.

Column 3, line 14, in Claim 12, delete "scanning," and insert -- scanning --, therefor.

Column 3, line 15, in Claim 12, delete "chive" and insert -- drive --, therefor.

Signed and Sealed this  
Fourth Day of February, 2014

Michelle K. Lee  
*Deputy Director of the United States Patent and Trademark Office*